United States Patent
Bonin

(10) Patent No.: US 11,215,989 B2
(45) Date of Patent: Jan. 4, 2022

(54) MONITORING A ROBOT

(71) Applicant: KUKA Deutschland GmbH, Augsburg (DE)

(72) Inventor: Uwe Bonin, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 388 days.

(21) Appl. No.: 16/006,096

(22) Filed: Jun. 12, 2018

(65) Prior Publication Data

US 2018/0356815 A1    Dec. 13, 2018

(30) Foreign Application Priority Data

Jun. 12, 2017  (DE) .................... 10 2017 005 604.8

(51) Int. Cl.
   *B25J 9/16*     (2006.01)
   *G05D 1/00*     (2006.01)

(52) U.S. Cl.
   CPC .......... *G05D 1/0055* (2013.01); *B25J 9/1674* (2013.01); *B25J 9/1676* (2013.01); *G05B 2219/40202* (2013.01); *G05B 2219/43202* (2013.01); *G05D 2201/0217* (2013.01)

(58) Field of Classification Search
   CPC .......... G05D 1/0055; G05D 2201/0217; B25J 9/1676; B25J 9/1674; G05B 2219/43202; G05B 2219/40202
   See application file for complete search history.

(56) References Cited

U.S. PATENT DOCUMENTS

| | | | |
|---|---|---|---|
| 9,122,266 B2* | 9/2015 | Franke | G05B 19/4061 |
| 2002/0186299 A1* | 12/2002 | Cofer | F16P 3/142 |
| | | | 348/152 |
| 2003/0076224 A1* | 4/2003 | Braune | F16P 3/142 |
| | | | 340/500 |
| 2003/0192758 A1* | 10/2003 | Murata | B25J 9/1674 |
| | | | 188/382 |
| 2006/0049939 A1* | 3/2006 | Haberer | F16P 3/142 |
| | | | 340/541 |
| 2007/0096670 A1 | 5/2007 | Hashimoto et al. | |
| 2008/0021597 A1* | 1/2008 | Merte | F16P 3/147 |
| | | | 700/255 |
| 2010/0191372 A1* | 7/2010 | Nihei | B25J 9/1676 |
| | | | 700/245 |

(Continued)

FOREIGN PATENT DOCUMENTS

| | | |
|---|---|---|
| CN | 103085057 A | 5/2013 |
| CN | 105269571 A | 1/2016 |

(Continued)

OTHER PUBLICATIONS

European Patent Office; Search Report in related European Patent Application No. 18173506.9 dated Oct. 22, 2018; 12 pages.

(Continued)

*Primary Examiner* — Stephen Holwerda
(74) *Attorney, Agent, or Firm* — Dorton & Willis, LLP

(57) ABSTRACT

A method for monitoring a robot includes monitoring a safety condition and operating the robot in a limitation operating mode for as long as the monitored safety condition is not fulfilled. A deceleration of the robot is commanded and monitored in the limitation operating mode for as long as the robot exceeds a velocity limit.

16 Claims, 1 Drawing Sheet

(56) References Cited

U.S. PATENT DOCUMENTS

| | | | |
|---|---|---|---|
| 2013/0110288 A1 | 5/2013 | Cassano et al. | |
| 2014/0018958 A1 | 1/2014 | Ueno et al. | |
| 2014/0067121 A1* | 3/2014 | Brooks | B25J 9/1676 700/255 |
| 2014/0135984 A1* | 5/2014 | Hirata | B25J 9/1676 700/255 |
| 2015/0217455 A1* | 8/2015 | Kikkeri | G06T 1/0014 700/259 |
| 2016/0016313 A1 | 1/2016 | Oyama et al. | |
| 2016/0082593 A1 | 3/2016 | Inagaki et al. | |
| 2016/0144509 A1 | 5/2016 | Gulhar et al. | |
| 2016/0214259 A1 | 7/2016 | Yamamoto et al. | |

FOREIGN PATENT DOCUMENTS

| | | |
|---|---|---|
| CN | 105437229 A | 3/2016 |
| CN | 105818169 A | 8/2016 |
| DE | 102015009007 A1 | 1/2016 |
| DE | 102016000565 A1 | 7/2016 |
| JP | 4648486 B2 | 3/2011 |
| JP | 2011152612 A | 8/2011 |
| JP | 5778891 B2 | 9/2015 |

OTHER PUBLICATIONS

German Patent Office; Office Action in related German Patent Application No. 10 2017 005 604.8 dated Feb. 15, 2018; 6 pages.
Korean Patent Office; Office Action in related Korean Patent Application No. 10-2018-0066961 dated Jun. 19, 2019; 6 pages.
Chinese Patent Office; Office Action in related Chinese Patent Application No. 201810601344.6 dated Dec. 31, 2020; 6 pages.
Chinese Patent Office; Search Report in related Chinese Patent Application No. 201810601344.6 dated Dec. 17, 2020; 3 pages.
European Patent Office; Examination Report in related European Patent Application No. 18 173 506.9 dated Apr. 7, 2021; 6 pages.

* cited by examiner

MONITORING A ROBOT

CROSS-REFERENCE TO RELATED APPLICATIONS

This application claims the benefit of priority under 35 U.S.C. § 119(a) to German Patent Application DE 10 2017 005 604.8, filed Jun. 12, 2017 (pending), the disclosure of which is hereby incorporated by reference in its entirety.

TECHNICAL FIELD

The present invention relates to a method and a system for monitoring a robot as well as a robot arrangement and a computer programming product for performing the method.

BACKGROUND

It is known from internal practice that a velocity of a robot can be reduced to a velocity limit using control technology as soon as a person enters an exterior warning field.

If the person enters an inner field of protection (and subsequently thereafter), the robot is stopped if its velocity exceeds the velocity limit.

Here, the field of protection has large enough dimensions such that the robot can safely be stopped before the person reaches it or its danger zone, even if its velocity has erroneously not been reduced following the entry into the warning field.

On the one hand, this causes a velocity of the robot to be reduced very early and at a great distance from persons, and, on the other hand, it causes a partially unnecessary complete interruption of its operation based upon the (emergency) stop.

The object of the present invention is to improve a monitoring of a robot, in particular to reduce, and preferably to eliminate, one or more of the aforementioned disadvantages.

This object is solved by a method of monitoring a robot as described herein, a system and computer programming product for the performance of such a method, and a robot arranged with a system as described herein for the performance of such a method.

SUMMARY

According to one embodiment of the present invention, a method for the monitoring of a robot comprises the following steps:

Monitoring of a safety condition, which is presently also described as a first safety condition; and Operation of a robot in a (presently referred to accordingly as a first limitation operating mode) limitation operating mode for as long as, in particular only while, this monitored safety condition is not fulfilled or while this is (still, in particular continuously) detected, wherein in this (first) limitation operating mode a deceleration of the robot, in particular through or in a control, in particular a velocity control, and/or in order to reach a velocity limit, is commanded and (this deceleration), in particular through or in a safety monitoring, is monitored, for as long as the robot exceeds a velocity limit or this velocity limit, predetermined or specific, in particular stored, in particular only for, this (first) safety condition or this (first) limitation operating mode, said velocity limit also presently referred to accordingly as a first velocity limit, [and wherein] in particular this (limitation operating mode and velocity limit-based, in particular specific) deceleration of the robot is only commanded and/or monitored while the robot exceeds this velocity limit, or while this is (still, in particular continuously) being detected.

In one embodiment, a deceleration capability of the robot, in particular one that is control-technical and/or propulsion-technical, can hereby be (better) taken into account, and/or a velocity of the robot can be reduced late(r), and/or the frequency of an unnecessary, in particular complete, interruption of its operation can be reduced.

In one embodiment, the robot comprises an arm with at least three, in particular at least six, in particular at least seven, axes or joints, which are or can be actuated, in particular through motors.

Additionally, or alternatively, in one embodiment, the robot is a mobile robot, [and] in one further development it comprises for this purpose a chassis, in particular rail-bound or freely moving, in particular omni-directional, in particular with wheels, in particular Mecanum or all-side wheels, crawlers, chains, or similar.

Additionally, or alternatively, in one embodiment, the robot is scheduled to collaborate with at least one person and is configured for this purpose, in particular with respect to hardware and/or software technology, in particular with respect to program technology, and is used for this purpose and is a so-called human-collaborating robot.

The present invention can be implemented with particular advantage, in particular with such at least six-axis, in particular redundant, mobile, and/or human-collaborating robots.

A non-fulfillment of a safety condition can, in one embodiment, be equivalent to or be equivalently detected as a fulfillment of a non-safety or lack-of-safety condition, preferably a complementary one. Thus, in particular, the removal of a release signal or the presence of a risk signal can likewise cause or trigger or be equivalent to a non-fulfillment of a safety condition or fulfillment of a non-safety or lack-of-safety condition.

In one embodiment, the inventive method can react to various safety conditions specifically, in particular in a cascading manner.

Accordingly, in one embodiment, [the method] comprises the following steps:

Monitoring of at least one further safety condition; and

Operation of the robot in a further limitation operating mode, for as long as, in particular only while, this further monitored safety condition is not fulfilled or while this is (still, in particular continuously) being detected, wherein in this further limitation operating mode a deceleration of the robot, in particular through or in a control or the control, in particular a velocity control, and/or in order to reach a velocity limit, is commanded and (this deceleration), in particular through or in a safety monitoring or the safety monitoring, is monitored, for as long as the robot exceeds a further velocity limit or this further velocity limit, predetermined or specific, in particular stored, in particular for, in particular only for, this further safety condition or this further limitation operating mode, which is slower, in particular lower, than the first velocity limit, [and wherein] in particular this (further limitation operating mode and velocity limit-based, in particular specific) deceleration of the robot is only commanded and/or monitored while the robot exceeds this further velocity limit or while this is (still, in particular continuously) being detected.

In one embodiment, various safety conditions can hereby be advantageously taken into account individually, and thus in particular a velocity of the robot can be reduced late(r)

and/or the frequency of an unnecessary, in particular complete, interruption of its operation can be reduced.

In one embodiment, in the (first) limitation operating mode, a target velocity limit, in particular a maximum one, in particular a maximum permissible one, of one or more axes and/or of a robot-fixed reference, in particular of the TCP and/or of another point at, in particular on, the robot, is reduced, in particular, through or in a control or the control, in particular velocity control, on the basis of or dependent upon the (first) velocity limit, in particular for the purposes of reaching or maintaining, in particular to this (first) predetermined velocity limit. Additionally or alternatively, in the further limitation operating mode, a target velocity limit, in particular a maximum one, in particular a maximum permissible one, of one or more axes and/or of a robot-fixed reference, in particular of the TCP and/or of another point at, in particular on, the robot, is reduced, in particular, through or in a control or the control, in particular velocity control, on the basis of or dependent upon the further velocity limit, in particular for the purposes of reaching or maintaining, in particular to this further predetermined velocity limit.

In one embodiment, the deceleration can hereby be realized for as long as the robot exceeds the (first or further) velocity limit or for the purposes of reaching or maintaining the (first or further) velocity, advantageously in particular through an additional corresponding function(ality) of the (velocity) control and/or in a gentle manner.

In one embodiment, a safety reaction is triggered in the event that the monitored deceleration of the robot (in the (first) limitation operating mode and/or in the further limitation operating mode) does not fulfill a delay condition which is predetermined or specific, in particular stored, in particular for, in particular only for, this (first or further) safety condition or (as soon as) this is detected.

This safety reaction can (respectively) comprise, in particular can be, a shutdown of the robot, in particular one that is not within the course of the trajectory and/or one that is caused by the introduction of brakes, in particular a shutdown of the robot with direct interruption of a power supply, in particular at least of its actuators, in particular a so-called STOP 0; a shutdown of the robot, in particular one that is within the course of the trajectory and/or motor-related, with subsequent interruption of a power supply, in particular at least of its actuators, in particular a so-called STOP 1; or a shutdown of the robot, in particular one that is within the course of the trajectory and/or motor-related, without subsequent interruption of a power supply, in particular at least of its actuators, in particular a so-called STOP 2.

In one embodiment, the safety can hereby be increased on the one hand, and at the same time, the frequency of an unnecessary, in particular complete, interruption of its operation can be reduced.

The predetermined delay condition (in the (first) limitation operating mode and/or in the further limitation operating mode) can, in one embodiment, comprise, in particular be, a minimum current delay or velocity reduction or (negative) acceleration of the robot and/or a delay or velocity reduction or (negative) acceleration of the robot, in particular one that is minimum, average, and/or integral, within a certain, in particular predetermined, period, and or (a reaching of) a maximum velocity after a certain, in particular predetermined, period, in particular a maintaining of a predetermined deceleration profile, in particular undershooting of a predetermined deceleration ramp.

In a further development, for this purpose a current delay of the robot is determined, in particular continuously, in particular by way of measurement technology-based, in particular continuous, detection of a posture and/or joint or axis position(s) and/or their chronological change(s), in particular first and/or second chronological derivation(s), and if applicable corresponding, in particular numerical, and/or one-fold or two-fold (chronological) differentiation.

Accordingly, the (first and/or further) velocity limit and/or the delay (condition) and/or the maximum velocity can (respectively) comprise, or be defined for, or be predetermined for a velocity, in particular a Cartesian one (or change of a velocity) of a robot-fixed reference of the robot, in particular of a TCP and/or of another point at, in particular on, the robot, and/or one or more, in particular the multiplicity, preferably all, (moved or actuated) axes or joints of the robot.

In one embodiment, the (first) velocity limit and/or the further velocity limit (respectively) amount to no more than 50%, in particular no more than 25%, in particular no more than 10% of a maximum permissible velocity of the robot, in particular one that is process-technical or program-technical and/or propulsion-technical, [and] in particular the (first or further) velocity limit can cause a shutdown of the robot or only be maintained or this can be detected provided or in the event that the robot shuts down, at least within the scope (of a tolerance) of a shutdown monitoring, or if this is detected. Additionally, or alternatively, the (first and/or further) velocity limit can be (respectively) set by the manufacturer as a default.

In one embodiment, respectively, in particular in combination, a deceleration capability of the robot, in particular one that is control-technical and/or propulsion-technical, can advantageously hereby be (better) taken into account, and/or a velocity of the robot can be reduced late(r), and/or the safety can be increased and/or the frequency of an unnecessary, in particular complete, interruption of its operation can be reduced.

The (first) safety condition and/or the further safety condition can, in one embodiment, be (respectively) single-valued or multi-valued or one-dimensional or multi-dimensional, [and can] in particular comprise in one embodiment two or more (sub-conditions, in particular single) conditions which are linked to one another disjunctively ("OR") or such that the (first or further) safety condition is (only) not fulfilled if all of its linked (sub-conditions or single) conditions are (cumulatively) not fulfilled or none of its linked (sub-conditions or single) conditions are fulfilled.

Additionally or alternatively, the (first) safety condition and/or the further safety condition can (respectively), in one embodiment, comprise, in particular can be, a remaining of the robot in a predetermined work frame and/or a minimum distance of the robot from a nearest person, in particular a person-free protection zone, and/or be monitored using one or more, in particular optical, distance detection means, in particular at least one laser scanner, at least one camera, at least one ultrasound sensor, or similar.

Thus, for example, the (first or further) safety condition is not fulfilled only i.e. exactly in the event or for as long as the robot does not remain in a predetermined work frame and simultaneously a minimum distance of the robot to a nearest person is undershot, [and] in particular at least one person remains in the protection zone, or for as long as this is detected or accordingly predetermined or defined.

In one embodiment, the safety can hereby be increased on the one hand, and at the same time, the frequency of an unnecessary, in particular complete, interruption of its operation can be reduced.

In one embodiment, the (first) limitation operating mode is (again) deactivated following a fulfillment of the (first)

safety condition, in particular in the event that the (first) safety condition is fulfilled or this is detected, in particular directly or as soon as the (first) safety condition is fulfilled or this is detected, or with a certain, in particular a predetermined, lag time, and, accordingly in one embodiment, is (again) activated following a non-fulfillment of the (first) safety condition, in particular as soon as the (first) safety condition is not fulfilled (any longer) or this is detected, in particular directly or as soon as the (first) safety condition is not fulfilled (any longer) or this is detected, or with a certain, in particular a predetermined, lag time.

Additionally or alternatively, in one embodiment, the further limitation operating mode is (again) deactivated following a fulfillment of the further safety condition, in particular in the event that the further safety condition is fulfilled or this is detected, in particular directly or as soon as the further safety condition is fulfilled or this is detected, or with a certain, in particular a predetermined, lag time, and, accordingly in one embodiment, is (again) activated following a non-fulfillment of the further safety condition, in particular as soon as the further safety condition is not fulfilled (any longer) or this is detected, in particular directly or as soon as the further safety condition is not fulfilled (any longer) or this is detected, or with a certain, in particular a predetermined, lag time.

Additionally or alternatively, in one embodiment, the (limitation operating mode and velocity-based, in particular specific) commanding and/or monitoring of the deceleration of the robot is (again) deactivated, in particular interrupted or canceled, following an undershooting of the (first) velocity limit, in particular in the event that the (first) velocity limit is undershot or this is detected, in particular directly or as soon as the (first) velocity limit is undershot or this is detected, or with a certain, in particular a predetermined, lag time, and, accordingly in one embodiment, is (again) activated or resumed following an excess of the (first) velocity limit, in particular as soon as the (first) velocity limit is exceeded or this is detected, in particular directly or as soon as the (first) velocity limit is exceeded or this is detected, or with a certain, in particular a predetermined, lag time.

Additionally or alternatively, in one embodiment, the (further limitation operating mode and velocity-based, in particular specific) commanding and/or monitoring of the deceleration of the robot is (again) deactivated, in particular interrupted or canceled, following an undershooting of the further velocity limit, in particular in the event that the further velocity limit is undershot or this is detected, in particular directly or as soon as the further velocity limit is undershot or this is detected, or with a certain, in particular a predetermined, lag time, and, accordingly in one embodiment, is (again) activated or resumed following an excess of the further velocity limit, in particular as soon as the further velocity limit is exceeded or this is detected, in particular directly or as soon as the further velocity limit is exceeded or this is detected, or with a certain, in particular a predetermined, lag time.

In one embodiment, the robot can hereby again increase the velocity independently depending upon the situation, and/or the frequency of an unnecessary, in particular complete, interruption of its operation can be reduced.

In one embodiment, the (first or further) safety condition and/or the deceleration of the robot (respectively) are (in the (first) limitation operating mode and/or in the further limitation operating mode) monitored in safe technology, in particular redundantly, in particular diversely, and/or the safety reaction is triggered in safe technology, in particular redundantly, in particular diversely.

Additionally, or alternatively, in one embodiment (in the (first) limitation operating mode and/or in the further limitation operating mode), the deceleration of the robot is commanded in non-safe technology, in particular through the (velocity) control.

In one embodiment, the safety can hereby be increased on the one hand, and at the same time the expenses can be reduced.

According to one embodiment of the present invention, a system is configured, in particular a control, for the performance of a method described here, in particular by hardware and/or software, in particular by program technology, and/or comprises:

Means for monitoring a (first) safety condition or the (first) safety condition;

Means for operating the robot in a (first) limitation operating mode or the (first) limitation operating mode, for as long as the monitored safety condition is not fulfilled, wherein these means comprise for their part:

Means for commanding and means for monitoring a deceleration of the robot of this (first) limitation operating mode, for as long as the robot exceeds a (first) velocity limit or the (first) velocity limit.

In one embodiment, the system or its means comprise:

Means for monitoring at least one further safety condition or the further safety condition; and means for operating the robot in a further limitation operating mode or the further limitation operating mode, for as long as this further monitored safety condition is not fulfilled, wherein these means comprise for their part: Means for commanding and means for monitoring a deceleration of the robot in this further limitation operating mode, for as long as the robot exceeds a slower further velocity limit or the slower further velocity limit; and/or Means for triggering a safety reaction in the event that the monitored deceleration of the robot does not fulfill a predetermined delay condition; and/or Means for deactivating the (first) limitation operating mode following a fulfillment of the (first) safety condition and/or the further limitation operating mode following a fulfillment of the further safety condition and/or the commanding and/or the monitoring of the deceleration of the robot following an undershooting of the velocity limit or further velocity limit; and/or Means for monitoring the (first) safety condition and/or the further safety condition and/or the deceleration of the robot in safe technology and/or means for triggering the (first or further) safety reaction in safe technology and/or means for commanding the deceleration of the robot in non-safe technology.

A means in the sense of the present invention may be embodied by way of technical hardware and/or software means, in particular comprising a processing, in particular micro-processing unit (CPU), preferably connected via a storage and/or bus system transmitting data and/or signals, in particular digital ones, and/or one or more programs or program modules. The CPU may be embodied such that commands are implemented in order to process a program saved in a storage system, record input signals from a data bus, and/or issue output signals to a data bus. A storage system may comprise one or more, in particular different, storage media, in particular optical, magnetic, solid matter, and/or other non-volatile media. The program may be embodied such that it represents and/or can implement the methods described here such that the CPU can perform the steps of such methods and thus can, in particular, monitor the robot. In one embodiment, a computer program product can comprise, in particular can be, a storage medium, in particular a non-volatile one, for storing a program and with a program stored on it, wherein a performance of this program causes a system or a control, in particular a computer, to perform a method described here or one or more of its steps.

In one embodiment, one or more, in particular all, steps of the method are performed in a partially or completely automated fashion, in particular by the system or the control or its respective means.

BRIEF DESCRIPTION OF THE DRAWINGS

The accompanying drawing, which is incorporated in and constitutes a part of this specification, illustrates an exemplary embodiment of the invention and, together with a general description of the invention given above, and the detailed description given below, serves to explain the principles of the invention.

DETAILED DESCRIPTION

Figure 1:
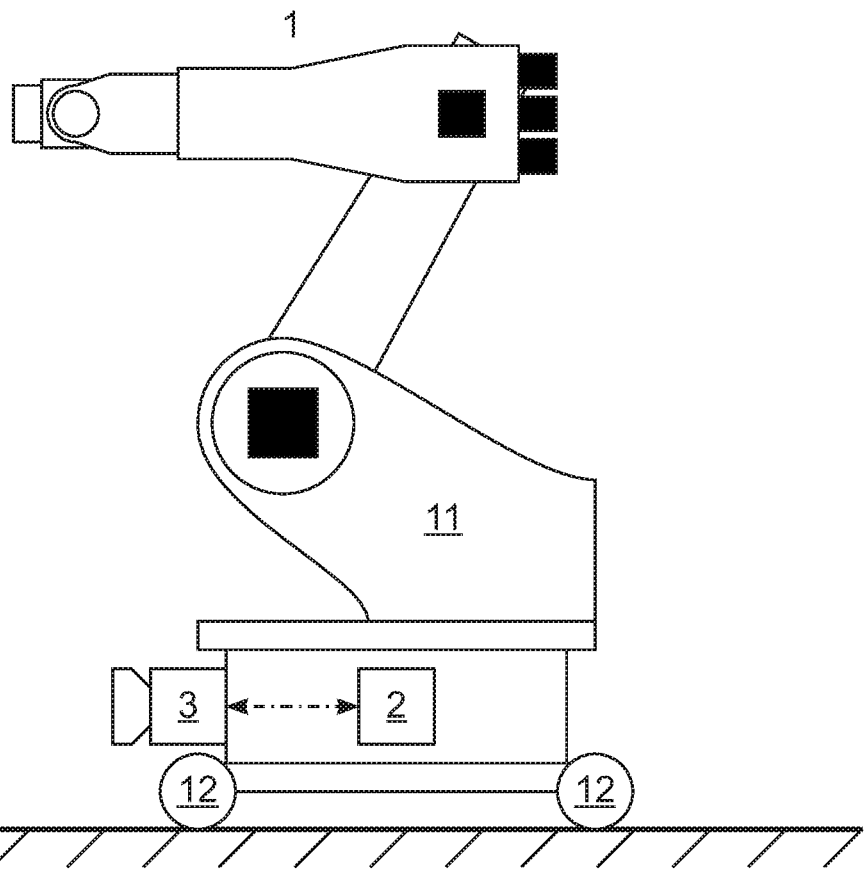
FIG. 1 is a schematic representation of a robot arrangement with a robot and a system for monitoring the robot according to one embodiment of the present invention.

FIG. 1 shows a robot arrangement with a robot and a system for monitoring the robot according to one embodiment of the present invention.

In the exemplary embodiment, the robot is a mobile and human-collaborating robot with a six-axes arm 11 and a chassis 12. In modifications, the arm 11 can also comprise more or fewer axes and/or the robot can be a stationary robot or the chassis 12 can be removed.

The system comprises a robot control 2, which controls, in particular, actuators of the robot and can monitor in safe technology a velocity of the robot and its changes.

For this purpose, the robot control 2 comprises joint positions and/or velocities, from which [the robot control] determines through forward kinematics a Cartesian velocity of the TCP and/or of a different point at, in particular on, the robot of the robot and/or through numerical differentiation a delay of the robot, in particular of its axes and/or of its TCP and/or of a different point at, in particular on, the robot.

The robot control 2 communicates with an optical distance detection means in the form of a laser scanner 3. In modifications, other and/or additional distance detection means can be provided and used.

The system, in particular its robot control 2, performs a method for monitoring the robot according to an embodiment of the present invention and is configured for this purpose, said method being explained in the following with reference to FIG. 2.

In a step S10, it is checked whether a first sub-condition of a (first) safety condition is fulfilled, for example whether the robot remains in a predetermined work frame. For as long as this is the case (S10: "Y"), step S10 is repeated.

(Only) if this is not the case, it is checked in a step S20 whether a second sub-condition of this (first) safety condition is fulfilled, for example whether the robot comprises at least one predetermined minimum distance from a nearest person. (At least) for as long as this is the case (S20: "Y"), the method and the robot control 2 return to step S10.

In the event that neither of the sub-conditions are cumulatively fulfilled (S10: "N" AND S20: "N"), the (first) safety condition is not fulfilled and the method and the robot control 2 switch into a (first) limitation operating mode and activate it, in that it continues with a step S30.

In one modification, the (first) safety condition can comprise only the second sub-condition or only the first sub-condition, or the first or second sub-condition, or step S10 or S20. Thus, in particular, step S10 can be removed, and the method and the robot control 2 can repeat S20 until the condition in step S20 is no longer fulfilled or until the robot does not comprise at least the predetermined minimum distance to a nearest person (S20: "N"). In further modifications, the (first) safety condition can also comprise, additionally or alternatively to the first and/or second sub-condition described here, one or more further sub-conditions.

In this [one], a (velocity) control of the robot control 2 reduces a maximum (permissible) target velocity for the TCP and the other point at the robot and/or the axes of the robot to a (first) velocity limit and checks whether the robot (already) maintains this (first) velocity limit, which for example is 25% of a maximum (permissible) velocity of the robot or has been set by the manufacturer as a default.

If this is the case (S30: "Y"), the method and the robot control 2 return to step S10.

Otherwise, or for as long as the robot exceeds this (first) velocity limit (S30: "N"), the (velocity) control of the robot control 2 decelerates the robot, in that it commands its actuators accordingly in a step S40.

In a step S50, the method and the robot control 2 monitor in safe technology whether a current delay of the robot comprises at least a predetermined value, and whether the robot realizes at least a predetermined deceleration ramp. If this is the case (S50: "Y"), the method and the robot control 2 return to the step S10.

Otherwise, or in the event that the robot does not fulfill this delay condition (S50: "N") in the (first) limitation operating mode (see S10: "N" AND S20: "N") upon exceeding the (first) velocity limit (see S30: "N"), i.e. despite correspondingly commanded deceleration (see S40), a STOP 0, a STOP 1, or a STOP 2 is triggered in a step S60.

It can be seen that the commanding (see S40) and monitoring (see S50) of this deceleration only occurs for as long as the monitored (first) safety condition is not fulfilled (see S10: "N" AND S20: "N") and the robot is operated accordingly in the (first) limitation operating mode, and for as long as (in this [mode]) the robot exceeds the (first) velocity limit (see S30: "N").

For as long as or as soon as the robot does not (any longer) exceed the (first) velocity limit (see S30: "Y"), a deceleration following an excess of the velocity limit is neither commanded nor monitored.

For as long as or as soon as the (first) safety condition is (again) fulfilled (S10: "Y" OR S20: "Y"), the (first) limitation operating mode is (again) deactivated, [and] in particular the reduction of the target velocity is lifted.

Figure 2:
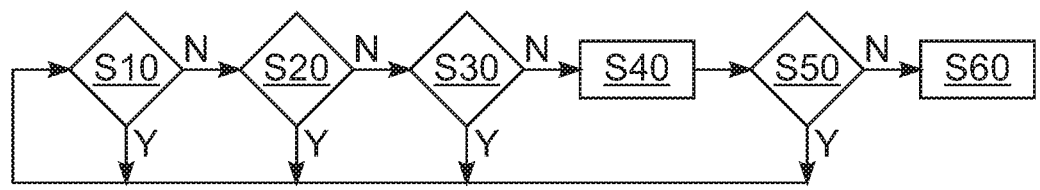
FIG. 2 is a flow chart illustrating an exemplary method for monitoring the robot according to one embodiment of the present invention.
Figure 3:
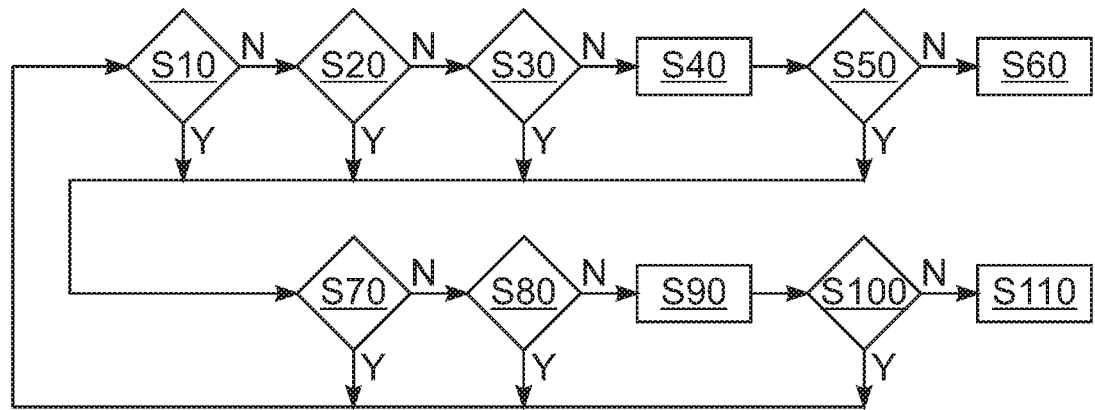
FIG. 3 is a flow chart illustrating an exemplary method for monitoring the robot according to a further embodiment of the present invention.

FIG. 3 shows in accordance with FIG. 2 a method for monitoring the robot according to the further embodiment of the present invention. Corresponding features are identified by identical reference numbers, so that the preceding description is reference and subsequently only differences are addressed.

In the embodiment in FIG. 3, the method and the robot control 2 from the steps S10, S20, S30, and S50 do not each return directly to step S10, but rather continue with a step S70 in which it checks whether a further safety condition is fulfilled.

In an exemplary fashion, this [embodiment] comprises only one single sub-condition i.e. single condition, for example a smaller minimum distance from a nearest person.

For as long as this further safety condition is fulfilled (S70: "Y"), the method and the robot control (2) (then) return to step S10.

Otherwise, or for as long as this further safety condition is not fulfilled (S70: "N"), in a manner analogous to step S30, in a step S80 the maximum (permissible) target velocity for the TCP and the other point at the robot and/or the axes of the robot in the (velocity) control of the robot control 2 are reduced to a slower further velocity limit, and it is checked whether the robot exceeds this slower further velocity limit, which in the exemplary embodiment causes a shutdown of the robot or corresponds to this [shutdown].

For as long as or as soon as the robot does not exceed the further velocity limit, i.e. shuts down within the scope of an accuracy of a shutdown (S80: "Y"), the method and the robot control 2 similarly return to step S10.

Otherwise, or for as long as the robot exceeds this further velocity limit (S80: "N"), the (velocity) control of the robot control 2 decelerates the robot, in that it commands its actuators in a step S90 that is analogous to step S40, in order to shut it down in a controlled fashion.

In a step S100, the method and the robot control 2 monitor in safe technology whether a current delay of the robot comprises at least one predetermined value, which can be (in magnitude), in particular, greater than the value checked in step S50, and the robot realizes at least one predetermined deceleration ramp, which can be, in particular, steeper than the one checked in step S50. For as long as this is the case (S100: "Y"), the method and the robot control 2 again return to step S10.

Otherwise, or in the event that the robot does not fulfill this delay condition (S100: "N") in the further limitation operating mode (see S70: "N") upon exceeding the further velocity limit (see S80: "N"), i.e. despite correspondingly commanded deceleration (see S90), a STOP 0 is triggered in a step S110.

FIGS. 2 and 3, in particular, show the interplay of the deceleration (see S40, S90) through the velocity control upon exceeding or in order to reach the (first or further) velocity limit and the safety monitoring (see S50, S100) of this deceleration.

Although exemplary embodiments have been explained in the above description, it is hereby noted that a plurality of modifications is possible. In addition, it is hereby noted that the exemplary embodiments are merely examples which are not intended in any way to restrict the scope of protection, the uses, and the construction. Rather, the preceding description gives a person skilled in the art a guideline for the implementation of at least one exemplary embodiment, wherein various modifications, in particular with respect to the function and arrangement of the components described, can be undertaken without departing from the scope of protection as indicated by the claims and the equivalent combinations of features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE NUMBERS

| | |
|---|---|
| 11 | Robot arm |
| 12 | Robot chassis |
| 2 | Robot control |
| 3 | Means for detecting distance |

What is claimed is:

1. A method for monitoring a robot having a plurality of axes actuated by respective drive motors and a microprocessor configured to control the drive motors, the method comprising:
   monitoring with the microprocessor an operation of the robot with respect to a first safety condition; and
   operating the robot in a first limitation operating mode for as long as the monitored safety condition is not fulfilled;
   in response to the robot exceeding a first velocity limit, commanding a deceleration of the robot and monitoring the deceleration in the first limitation operating mode; and
   triggering a safety reaction in response to a predetermined delay condition not being fulfilled by the monitored deceleration of the robot;
   wherein the predetermined delay condition comprises at least one of:
   a delay of the robot within a certain period, or
   a maximum velocity of the robot after a certain period.

2. The method of claim 1, further comprising:
   monitoring at least one second safety condition; and
   operating the robot in a second limitation operating mode for as long as the second safety condition is not fulfilled; and
   commanding a deceleration of the robot and monitoring the deceleration in the second limitation operating mode for as long as the robot exceeds a second velocity limit;
   wherein the second velocity limit is lower than the first velocity limit.

3. The method of claim 2, wherein at least one of the first velocity limit or the second velocity limit is not more than 50 percent of a maximum velocity of the robot.

4. The method of claim 3, wherein at least one of the first or second velocity limits causes a stop of the robot.

5. The method of claim 2, wherein at least one of the first safety condition or the second safety condition is at least one of:
   single-valued or multi-valued;
   comprises confining the robot within a predetermined work frame; or
   comprises monitoring a minimum distance of the robot from a nearest person to the robot.

6. The method of claim 5, wherein monitoring the minimum distance comprises determining a person-free protection area.

7. The method of claim 2, wherein at least one of the first safety condition or the second safety condition is monitored with the assistance of at least one distance detection means.

8. The method of claim 7, wherein the distance detection means is an optical detection means.

9. The method of claim 1, wherein the safety reaction comprises a stop of the robot.

10. The method of claim 9, wherein the safety reaction further comprises one of:
 a direct interruption of a power supply;
 a subsequent interruption of the power supply; or
 no subsequent interruption of the power supply.

11. The method of claim 1, further comprising at least one of:
 deactivating the first limitation operating mode in response to a fulfillment of the first safety condition;
 deactivating the second limitation operating mode in response to a fulfillment of the second safety condition; or
 deactivating at least one of the commanding or the monitoring of the deceleration of the robot in response to an undershooting of the first velocity limit or the second velocity limit, respectively.

12. The method of claim 1, wherein the robot is at least one of:
 a mobile robot; or
 configured to collaborate with at least one person in coordinated manner.

13. The method of claim 1, wherein at least one of:
 at least one of the first safety condition, the second safety condition, or the deceleration of the robot is monitored according to safe technology;
 the safety reaction is triggered according to safe technology; or
 the deceleration of the robot is commanded in non-safe technology.

14. A system for monitoring a robot, the system comprising:
 means for monitoring operation of the robot with respect to a first safety condition;
 means for operating the robot in a limitation operating mode for as long as the first safety condition is not fulfilled, the operating means comprising:
  means for commanding and means for monitoring a deceleration of the robot in the limitation operating mode for as long as the robot exceeds a velocity limit:
 wherein the operating means is configured to trigger a safety reaction in response to a predetermined delay condition not being fulfilled by the monitored deceleration of the robot;
 wherein the predetermined delay condition comprises at least one of:
  a delay of the robot within a certain period, or
  a maximum velocity of the robot after a certain period.

15. A robot arrangement, comprising at least one robot and a system according to claim 14 for monitoring the at least one robot.

16. A computer program product for monitoring a robot having a plurality of axes actuated by respective drive motors, the computer program product comprising program code stored on a non-transitory, computer-readable medium, the program code, when executed on a microprocessor, causing the microprocessor to:
 monitor an operation of the robot with respect to a first safety condition;
 operate the robot in a first limitation operating mode for as long as the first safety condition is not fulfilled;
 in response to the robot exceeding a first velocity limit, command a deceleration of the robot and monitor the deceleration in the first limitation operating mode; and
 trigger a safety reaction in response to a predetermined delay condition not being fulfilled by the monitored deceleration of the robot;
 wherein the predetermined delay condition comprises at least one of:
  a delay of the robot within a certain period, or
  a maximum velocity of the robot after a certain period.

* * * * *